Sept. 4, 1962     H. L. BOWDITCH     3,052,324
DAMPING DEVICE
Filed March 16, 1961
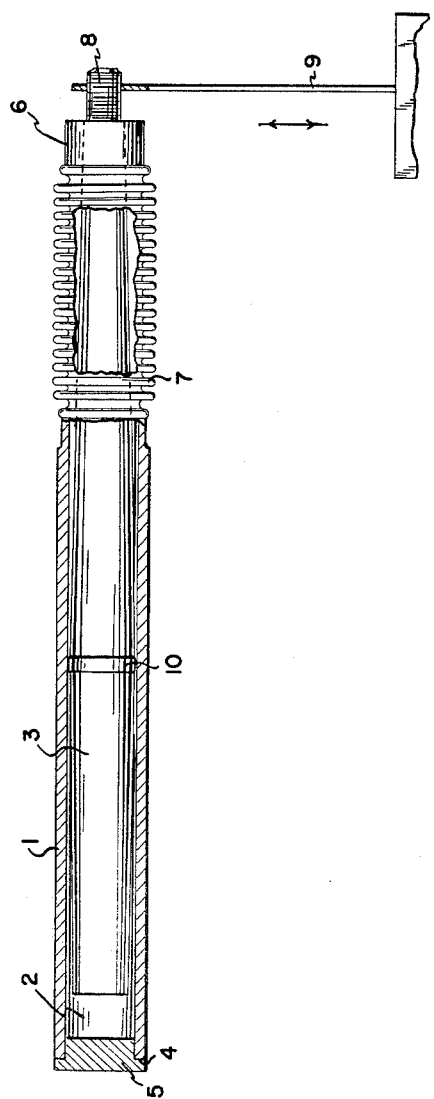
INVENTOR.
Hoel L. Bowditch
BY
*Curtis, Morris, & Safford*
ATTORNEYS 3,052,324
DAMPING DEVICE
Hoel L. Bowditch, Foxboro, Mass., assignor to
The Foxboro Company, Foxboro, Mass.
Filed Mar. 16, 1961, Ser. No. 96,211
7 Claims. (Cl. 188—1)

This invention relates to damping devices of the viscous fluid type.

Such damping devices, often referred to as "dashpots," find extensive use in industry for stabilizing the response of measuring apparatus by absorbing undesirable mechanical vibrations. An example of such measuring apparatus is a "force-balance" differential-pressure meter as disclosed in U.S. Patent 2,956,212, issued to E. O. Olsen et al. on October 11, 1960. The instrument shown in that patent includes a pivotally-mounted "force bar" which is acted upon by two opposed forces, an input force and a rebalance force, and in response thereto controls a transducer to produce an electrical signal corresponding to the measured differential pressure. A dashpot according to the principles of this invention may advantageously be connected to such a force bar to damp undesirable mechanical vibrations without affecting the normal operation of the meter.

To meet the requirements of modern instruments, a dashpot should be of small size and rugged construction and yet be capable of providing a large damping effect for quite small vibratory motions of the operating mechanism. For example, to obtain accurate results with the above Olsen meter, any vibration (hunting, oscillation, etc.) of the force bar should not exceed 1% of its full-scale movement which is only about .0003″, and consequently the dashpot must be capable of providing immediate and substantial reaction forces without noticeable hysteresis or dead space. Moreover, a dashpot for this type of application desirably is a sealed unit so that it can be oriented in any position without spillage of the viscous fluid, and means should be provided to avoid adverse effects from the expansion or contraction of the fluid resulting from ambient temperature changes.

Various dashpot constructions have been proposed from time to time to solve these problems, as shown for example in U.S. Patent 2,837,175, but these dashpots have not been fully satisfactory. In particular, the efficiency of such devices has been undesirably low, and they have been bulky and overly expensive to manufature. The improved dashpot of the present invention avoids the limitations of such prior art arrangements, especially by means of a unique and simple structure that affords a substantial and uniform damping effect within a relatively small volume.

Accordingly, it is an object of this invention to provide an improved device for damping undesirable mechanical vibrations. Another object is to provide a damping device of the viscous fluid type which is reliable in operation and, yet, simple and economical to manufacture. Still another object is to provide an efficient damping device of the viscous fluid type for effecting increased damping action for small vibratory movements.

In the embodiment of the present invention described herein, these and other objects are achieved by means of an elongated fluid-displacing rod which extends within a tubular casing filled with viscous fluid. This rod is longitudinally tapered from a central region (of maximum diameter) towards the two ends (of minimum diameter), and is adapted for rocking movement about the central region which serves as a fulcrum by its contact with the tubular casing. The amount of liquid within the casing is relatively small, thereby minimizing the effects of temperature variations, and yet the damping effect is quite high because the liquid must move through a narrow confined channel between the rod and the casing.

Fuller appreciation of this invention may be had by consideration of the following description in conjunction with an illustrative embodiment thereof as set forth in the accompanying drawing.

Referring now to the drawing, the dashpot comprises a rigid tubular casing 1 containing a viscous fluid 2 and an elongated fluid-displacing damping rod 3. The viscous fluid is hermetically sealed within the tubular casing at one end 4 by a plug 5 and at the other end 6 by a bellows 7 secured to the casing. Normally this casing is fastened, e.g. at end 4, to a fixed frame member or the like (not shown) of the instrument with which the dashpot is used.

The rod 3 is completely surrounded by the viscous fluid 2, and is formed with an end portion 8 extending through the bellows 7 to a flexible metal connection strip 9. This strip, in turn, is secured at its other end to the mechanism to be damped, e.g. the force bar of the above Olsen et al. patent. The rod 3 is slightly tapered towards both ends from a central cylindrical portion 10 which serves as a fulcrum for rocking movement of rod 3 in response to vibratory movement of the connection strip 9.

Generally speaking, if an elongated member is placed in a liquid (e.g. a paddle in a can of paint) and oscillated from one end, it will tend to rock about a natural pivot point near the midpoint of its immersed length. Advantage is taken of this characteristic in the present design in that the central fulcrum portion 10, being near the longitudinal midpoint of the rod 3, is approximately at the natural center of oscillation of the rod. The central portion 10 is spaced from the casing 1 a distance just sufficient to prevent binding at the maximum desired angular movement of the rod 3. Longitudinal slots (not shown) may be provided at spaced points about the periphery of the central portion to assure free passage of the fluid.

The bellows 7, formed as usual of resilient material, permits essentially free lateral movement of the rod end portion 8. In addition, this bellows expands or contracts to accommodate the changes in volume of the viscous fluid 2 due to variations in ambient temperature. The resulting longitudinal movement of the rod end portion 8 does not interfere with the proper operation of the dashpot, due to the flexbility of the connection strip 9. Also, it will be evident that the corresponding movement of the fulcrum point 10 with respect to the casing 1 does not affect the dashpot operation. In any event, such longitudinal movement will be relatively small because with the present construction only a small amount of liquid is required.

When the rod 3 pivots about its fulcrum point at the central portion 10, it is evident that there must be a corresponding displacement of the fluid 2 about the rod 3. The displacement of this fluid absorbs energy frictionally and thereby develops a restraining force to resist the movements of the rod. This restraining force serves to damp the undesirable mechanical vibrations of the operating element secured to the connection strip 9. The initial resistive force is quite high with the present construction due to the fact that the channel for liquid movement between the rod and the casing 1 is relatively confined, i.e. there is only a thin layer of liquid between these two parts.

When an elongated member in a fluid is rocked about a pivot point, the fluid reaction produces not only a restraining force perpendicular to the longitudinal axis, but also produces a component of force in the longitudinal direction (as in sculling a boat with an oar over the stern). However, due to the symmetrical arrangement of the rod 3, the longitudinal forces developed on one side of the fulcrum 10 are opposed and substantially balanced by the longitudinal forces developed on the other side of the fulcrum. Thus, the rod 3 is nearly free of longitudinal forces, which affords improved operating capabilities.

It will be observed that, during operation, the parts of rod 3 which are near the fulcrum point move a smaller distance laterally than do the parts farther out towards the ends of the rod. However, it is considered that this smaller lateral movement near the fulcrum nevertheless contributes substantially to the damping effect. Apparently, this is due to the fact that the displaced viscous fluid 2 must move within a relatively confined (restricted) channel around the rod, i.e. circumferentially within the space between the rod and the casing 1. Since the circumferential channel defined by this space has a smaller cross-section at points nearer the fulcrum, the resistance to fluid displacement is greater there, and consequently the smaller movements of the more central parts of the rod produce proportionately larger restraining forces. In other words, the vibration energy apparently is absorbed by the viscous fluid 2 nearly uniformly along the entire length of the rod, thereby assuring a large damping effect for a given size of dashpot.

Accordingly, there is provided an efficient dashpot of novel construction capable of damping vibratory motion to a very high degree. In actual tests on an instrument of the type disclosed in the above-identified Olsen patent, vibrations of up to 2 g were applied in the frequency range of 10–30 c.p.s., and the dashpot of this invention damped the vibratory movement of the force bar to below 1% of full scale movement. Moreover, this dashpot is economical to manufacture, and provides a small, rugged unit more suitable for industrial purposes than prior art dashpots.

Although a preferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

I claim:

1. A damping device comprising elongated casing means containing a viscous fluid, said casing means having an inner side wall and a pair of ends, an elongated fluid-displacing member within said casing means and disposed in said viscous fluid, means at one end of said casing means for flexibly holding said member for pivotal movement about an axis defined by the contact of a portion of said member and the inner side wall of said casing means at a position intermediate said ends, and means responsive to vibrational energy to be damped for moving said member about said pivot axis.

2. A damping device as set forth in claim 1, wherein said casing means comprises an elongated tubular member rigidly closed at one end thereof, said holding means comprising a resilient element sealing the other end of said tubular member and arranged to accommodate both longitudinal and lateral movement of said fluid-displacing member.

3. A damping device of the viscous fluid type comprising a casing member for containing said viscous fluid, a fluid-displacing member within said casing member and immersed in said viscous fluid, and means for supporting said fluid-displacing member for pivotal movement about an axis, at least one of said members being shaped to provide an increased spacing between said members at points remote from said pivot axis when said casing and fluid-displacing members are aligned with their longitudinal axes parallel to one another.

4. In a damping device as set forth in claim 3, wherein said pivot axis is defined by a region of contact between said members, said fluid-displacing member being tapered to provide decreased lateral width remote from said pivot axis.

5. In a damping device as set forth in claim 4, wherein said region of contact is approximately midway between the ends of said fluid-displacing member, said fluid-displacing member being tapered towards both ends thereof.

6. A dashpot comprising casing means having sealed therein a viscous fluid for absorbing vibrational energy, one end of said casing means being flexible, a fluid-displacing member disposed in said viscous fluid, one end of said member extending through said flexible casing end for receiving said vibrational energy, said member having a cylindrical central portion and tapered ends, said member being supported for rocking movement on a part of said central portion in contact with the inner wall of said casing means on said vibrational energy being received, means for directing vibrational energy to said member whereby said member is rocked and said viscous fluid is displaced around the tapered parts of said member, the portions of said tapered parts around which said viscous fluid is displaced being close to corresponding sections of said inner wall whereby the displacement of said viscous fluid is substantially restricted.

7. A damping device comprising sealed casing means containing a viscous fluid, an elongated fluid-displacing member within said casing means and including an element integral therewith extending externally of said casing means to receive vibrational energy to be damped, mounting means secured to said casing means to hold said member for vibrational movement, said mounting means including means to accommodate lateral movement of the part of said member connected to said mounting means and providing pivotal movement of said member about an axis interiorly of said casing means when said external element is vibrated laterally.

References Cited in the file of this patent

UNITED STATES PATENTS 2,837,175     Schweitzer _____ June 3, 1958

FOREIGN PATENTS 923,223     France _____ Feb. 17, 1947